United States Patent
Chun et al.

(10) Patent No.: US 7,848,436 B2
(45) Date of Patent: Dec. 7, 2010

(54) METHOD FOR DETECTING OFDM TIMING IN OFDM SYSTEM

(75) Inventors: Jin-Young Chun, Seoul (KR); Yong-Suk Jin, Gyeonggi-Do (KR); Bin-Chul Ihm, Gyeonggi-Do (KR)

(73) Assignee: LG Electronics, Inc., Seoul (KR)

( * ) Notice: Subject to any disclaimer, the term of this patent is extended or adjusted under 35 U.S.C. 154(b) by 801 days.

(21) Appl. No.: 11/573,687

(22) PCT Filed: Aug. 17, 2005

(86) PCT No.: PCT/KR2005/002693
§ 371 (c)(1),
(2), (4) Date: Feb. 13, 2007

(87) PCT Pub. No.: WO2006/019255
PCT Pub. Date: Feb. 23, 2006

(65) Prior Publication Data
US 2007/0268974 A1    Nov. 22, 2007

(30) Foreign Application Priority Data

Aug. 17, 2004   (KR) ............... 10-2004-0064541
Aug. 17, 2004   (KR) ............... 10-2004-0064543

(51) Int. Cl.
*H04K 1/10* (2006.01)

(52) U.S. Cl. ............... 375/260; 375/296; 375/299; 375/347; 375/348; 375/349; 375/363

(58) Field of Classification Search ............... 375/260, 375/296, 299, 347, 348, 349, 363
See application file for complete search history.

(56) References Cited

U.S. PATENT DOCUMENTS

| 6,618,452 | B1 | 9/2003 | Huber et al. | |
|---|---|---|---|---|
| 2004/0114551 | A1* | 6/2004 | Gavillero et al. | 370/324 |
| 2005/0002369 | A1* | 1/2005 | Ro et al. | 370/342 |

FOREIGN PATENT DOCUMENTS

JP    2002049729    2/2002

(Continued)

OTHER PUBLICATIONS

Park, Byungjoon et al.; "A Novel Estimation Method For OFDM Systems"; IEEE Communications Letters, vol. 7, No. 5, May 2003.

(Continued)

*Primary Examiner*—Shuwang Liu
*Assistant Examiner*—Kabir A Timory
(74) *Attorney, Agent, or Firm*—Lee, Hong, Degerman, Kang & Waimey

(57) ABSTRACT

A scheme for detecting a symbol timing (synchronization) of an Orthogonal Frequency Division Multiplexing (OFDM) system in which a transmitting end inserts a Cyclic Prefix (CP) and/or a Cyclic Suffix (CS) in an OFDM symbol for transmission, and a receiving end uses a new timing metric to detect a timing (synchronization) of the OFDM symbol based on a maximum value of the timing metric, whereby when applying the method for detecting the symbol timing of the OFDM system according to the present invention, the symbol timing can be obtained more precisely, to thusly enable stabilizing of performances of the OFDM system.

7 Claims, 7 Drawing Sheets

FOREIGN PATENT DOCUMENTS

JP   2002185423   6/2002
JP   2004064793   2/2004

OTHER PUBLICATIONS

Daniel Landstrom, et al: "Symbol Time Offset Estimation in Coherent OFDM Systems"; IEEE Transactions on Communications. vol. 50, No. 4, Apr. 2002.

H.Minn et al., IEEE: "A Simple and Efficient Timing Offset Estimation for OFDM Systems", Department of Electrical and Computer Engineering, University of Victoria, Canada, 2000.

Lashkarian N. Kiaeri, S.: "Globally optimum ML estimation of timing and frequency offset in OFDM systems", Communications, 2000. ICC 2000, IEEE International Conference, 2000.

* cited by examiner

- CONVENTIONAL ART -

- CONVENTIONAL ART -

- CONVENTIONAL ART -

- CONVENTIONAL ART -

- CONVENTIONAL ART -

FIG. 11 typical OFDM symbol (symbol A)

$$x, a_1+b_1, \cdots, a_{(N/2)-1}+b_{(N/2)-1}, y, a^*_{(N/2)-1}-b^*_{(N/2)-1}, \cdots, a^*_1-b^*_1$$

Vs

$$a^*_{\frac{L}{2}}-b^*_{\frac{L}{2}}, \cdots a^*_1-b^*_1, x, a_1+b_1, \cdots a_{\frac{N}{2}-1}+b_{\frac{N}{2}-1},$$

$$y, a^*_{\frac{N}{2}-1}-b^*_{\frac{N}{2}-1}, \cdots a^*_1-b^*_1, x, a_1+b_1, \cdots a_{\frac{L}{2}-1}+b_{\frac{L}{2}-1}$$

OFDM symbol according to second embodiment of the present invention graph according to the related art Vs graph according to the present invention

METHOD FOR DETECTING OFDM TIMING IN OFDM SYSTEM

CROSS-REFERENCE TO RELATED APPLICATIONS

Pursuant to 35 U.S.C. §119, this application claims the benefit of earlier filing date and right of priority to International Application No. PCT/KR05/02693, filed on Aug. 17, 2005, to Korean Application No. 10-2004-0064541, filed on Aug. 17, 2004, and to Korean Application No. 10-2004-0064543, filed on Aug. 17, 2004, the contents of all of which are hereby incorporated by reference herein in their entirety.

TECHNICAL FIELD

The present invention relates to an Orthogonal Frequency Division Multiplexing (OFDM) system, and more particularly, to a scheme for detecting an OFDM symbol timing (synchronization) in an OFDM system.

RELATED ART

In general, an orthogonal frequency division multiplexing (OFDM) is a transmission method for increasing a data transfer rate by converting a serial data column into a plurality of parallel data columns and loading each converted signal (OFDM symbol) on a different subcarrier for transmission. At this time, an interval between subcarriers is selected as a minimum interval capable of maintaining orthogonality so as to maximize frequency efficiency.

Therefore, the OFDM symbol loaded on the subcarrier has a relatively wide symbol interval as compared with that of a single carrier signal. As a result, in the OFDM system, an interference of an adjacent symbol (ISI) is reduced to thusly enable a reliable demodulation even in a multipath channel, and particularly, each subcarrier has a narrow-band characteristic so as to enable a simplified structure of a channel equalizer.

However, when the OFDM symbol is transmitted through the multipath channel, an inter symbol interference may occur by a path delay.

Accordingly, in the conventional OFDM system, in order to avoid the ISI by the path delay, a transmission symbol can be constructed by partially copying a rear portion of the OFDM symbol and thereafter inserting a Cyclic Prefix (CP) as illustrated in FIG. 1, or constructed by partially copying a front portion of the OFDM symbol and thereafter inserting a Cyclic Suffix (CS) as illustrated in FIG. 2. FIG. 3 illustrates transmission symbols composed of the CP or CS having a length L and an OFDM symbol having a length N.

Further, in another embodiment, in the conventional OFDM system, as illustrated in FIG. 4, the transmission symbol can be constructed by inserting both the CP and the CS.

Therefore, in the conventional OFDM system, a transmitting end transmits the symbol constructed by such embodiments, and a receiving end detects a timing of the transmission symbol using the characteristics that the CP is identical to the rear portion of the OFDM symbol or the CS is identical to the front portion of the OFDM symbol.

For example, assuming that a reception signal is $r_m$, the receiving end uses the CP to obtain a maximum value of a timing metric $M_{CP}(d)$, as shown in [Formula 1], thereby detecting a starting point of the transmission symbol (detecting of the symbol timing (synchronization)).

$$M_{CP}(d) = \frac{|P_{CP}(d)|}{R_{CP}(d)} \quad \text{[Formula 1]}$$

Here, the $P_{CP}(d)$ of [Formula 1], as a correlation metric, is obtained by [Formula 2]. The $R_{CP}(d)$, which is a value to normalize the correlation metric $P_{CP}(d)$ with respect to a relatively large change in the size of the OFDM symbol (i.e., energy for the OFDM symbol), is obtained by the following [Formula 3].

$$P_{CP}(d) = \sum_{m=0}^{L-1} r^*_{d+m} r_{d+m+N} \quad \text{[Formula 2]}$$

$$R_{CP}(d) = \sum_{m=0}^{L-1} |r_{d+m}|^2 \quad \text{[Formula 3]}$$

Therefore, a value (i.e., d: time index) for maximizing the timing metric $M_{CP}(d)$ Indicates a position of the CP, and accordingly the starting point of the OFDM symbol can be d+L.

In another example, the receiving end uses the CS to obtain the maximum value of the timing metric $M_{CP}(d)$, as shown in the following [Formula 4], thereby detecting the starting point of the transmission symbol (detecting the symbol timing). That is, the method for obtaining the maximum value of the timing metric $M_{CP}(d)$ using the CS is equal to the method therefor using the CP.

$$M_{CS}(d) = \frac{|P_{CS}(d)|}{R_{CS}(d)} \quad \text{[Formula 4]}$$

Here, the $P_{CS}(d)$ and the $R_{CS}(d)$ are obtained according to [Formula 5] and [Formula 6], respectively.

$$P_{CS}(d) = \sum_{m=0}^{L-1} r^*_{r+m} r_{d+m+N} \quad \text{[Formula 5]}$$

$$R_{CS}(d) = \sum_{m=0}^{L-1} |r_{d+m}|^2 \quad \text{[Formula 6]}$$

Accordingly, the value d for maximizing the timing metric $M_{CS}(d)$ indicates the starting point of the OFDM symbol, which denotes that the starting point of the transmission symbol is also d.

In still another example, the receiving end uses both the CS and the CP to obtain the maximum value of the timing metric, thereby detecting the starting point of the transmission symbol (detecting of the symbol timing). In this method, the maximum value of the timing metric can be obtained by combining [Formula 1] and [Formula 4].

However, the method for detecting the symbol timing of the conventional OFDM system only uses the limited information (i.e., the CP or CS). In general, the CP or CS only takes up about ¼ to ¹⁄₃₂ of the entire symbol length, so as to have a less amount of data. Accordingly, if the less amount of data of the CP or CS is used to obtain the correlation as shown in [Formula 1] and/or [Formula 4], a structural problem in the CP or CS may cause indefiniteness for identifying the maximum value of the correlation, as shown in FIG. 5. As a result the receiving end cannot definitely detect the symbol timing, resulting in an undesirable lowering of a reception rate.

DISCLOSURE OF THE INVENTION

Therefore, an object of the present invention is to provide a method for detecting an OFDM symbol-timing (synchronization) of an OFDM system for performing a symbol timing procedure more precisely without changing a structure of a transmission symbol.

Another object of the present invention is to provide a new structure of a transmission symbol and a method for detecting a symbol timing using the structure, thereby precisely performing a symbol timing procedure.

To achieve these and other advantages and in accordance with the purpose of the present invention, as embodied and broadly described herein, there is provided a method for detecting a symbol timing of an OFDM system according to an embodiment in which a transmitting end inserts a Cyclic Prefix (CP) or a Cyclic Suffix (CS) in an Orthogonal Frequency Division Multiplexing (OFDM) symbol for transmission, and a receiving end employs a new timing metric to obtain a maximum value of the timing metric with respect to a reception signal, thereby detecting a timing of an OFDM symbol.

Preferably, the timing metric is differently defined when the transmission symbol uses the CP and the CS, respectively.

Preferably, when the transmission symbol uses the CP, the maximum value of the timing metric indicates a position of the CP, and a value obtained by adding a length of the CP to the maximum value indicates a starting point of the OFDM symbol.

Preferably, when the transmission symbol uses the CS, the maximum value of the timing metric indicates the starting point of the OFDM symbol.

According to another embodiment, there is provided a method for detecting a symbol timing of an OFDM system in which a transmitting end inserts a Cyclic Prefix (CP) or a Cyclic Suffix (CS) in an Orthogonal Frequency Division Multiplexing (OFDM) symbol to transmit a transmission symbol having continuity, and a receiving end employs a new timing metric to obtain a maximum value of the timing metric with respect to a reception signal, thereby detecting a timing of the OFDM symbol.

Preferably, the transmission symbol is generated by simultaneously inserting the CP and the CS in front and rear portions of the OFDM symbol, respectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 11 is a view for comparing a transmission symbol according to a second embodiment of the present invention with a typical transmission symbol.

MODES FOR CARRYING OUT THE PREFERRED EMBODIMENTS

Figure 1:
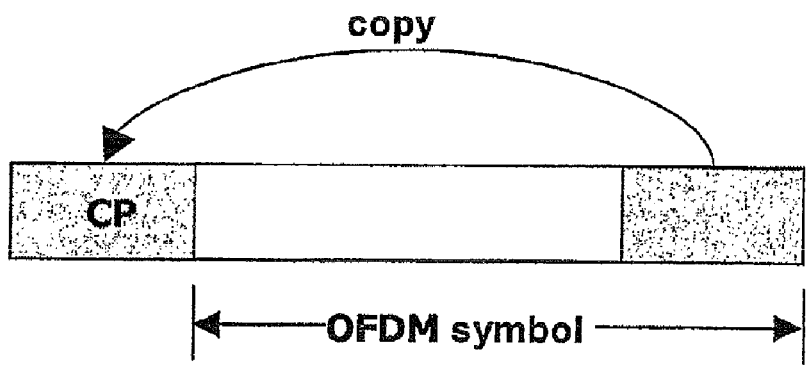
FIG. 1 is a view illustrating an exemplary structure of a transmission symbol in which Cyclic Prefix (CP) is inserted.
Figure 2:
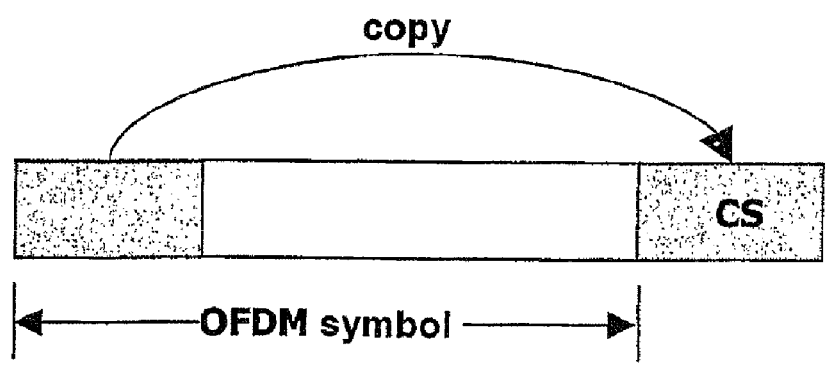
FIG. 2 is a view illustrating an exemplary structure of a transmission symbol in which Cyclic Suffix (CS) is inserted.

Reference will now be made in detail to some preferred embodiments of the present invention, examples of which are illustrated in the accompanying drawings.

Hereinafter, some preferred embodiments of the present invention will be explained.

A first embodiment of the present invention proposes a method for detecting a symbol timing (synchronization) capable of obtaining the symbol timing more precisely without changing a structure of a transmission symbol. That is, a transmitting end of an OFDM system transmits a transmission symbol that a CP or CS is inserted in an OFDM symbol, and a receiving end uses a timing metric $M_{new}(d)$ proposed in the present invention to detect a timing (synchronization) of the OFDM symbol.

[Formula 7] indicates an example of a timing metric $M_{new}(d)$ applied to a method for detecting a symbol timing (synchronization) according to the present invention. The example shows a timing metric $M_{new\_CP}(d)$ which is applied when the Cyclic Prefix (CP) is used to obtain a symbol timing.

$$M_{new\_CP}(d) = \frac{|P_{new\_CP}(d)|}{R_{new\_CP}(d)} M_{CP}\left(d - \frac{N}{2} - L\right) \quad \text{[Formula 7]}$$

Here, L denotes a length of the CP, N denotes a length of the OFDM symbol, and $P_{new\_cp}(d)$ denotes a correlation metric. The $R_{new\_CP}(d)$ denotes a value (i.e., energy of the OFDM symbol) for normalizing the $P_{new\_CP}(d)$ with respect to a great change in a size of an OFDM sample.

The $P_{new\_CP}(d)$ and the $R_{new\_CP}(d)$ are obtained according to the following [Formula 8] and [Formula 9], respectively.

$$P_{new\_CP}(d) = \sum_{m=1}^{N/2-1} r(d-m)r(d+m) \quad \text{[Formula 8]}$$

$$R_{new\_CP}(d) = \sum_{m=1}^{N/2-1} |r(d+m)|^2 \quad \text{[Formula 9]}$$

Here, the $r_m$ denotes a reception signal.

Therefore, the receiving end obtains the maximum value (d: time Index) of the timing metric $M_{new\_CP}(d)$ with respect to the reception signal. In this case, the maximum value d indicates a position of the CP, and a value d+L obtained by adding L to the d may be the starting point of the OFDM symbol.

The following [Formula 10] indicates another example of the timing metric $M_{new}(d)$ applied to the method for detecting the symbol timing (synchronization) according to the present invention. The example shows an example of the timing metric $M_{new\_CS}(d)$ applied when the Cyclic Suffix (CS) is used to obtain the symbol timing.

$$M_{new\_CS}(d) = \frac{|P_{new\_CS}(d)|}{R_{new\_CS}(d)} M_{CS}\left(d - \frac{N}{2}\right) \quad \text{[Formula 10]}$$

Here, L denotes a length of the CS, N denotes a length of the OFDM symbol, and the $P_{new\_CS}(d)$ denotes a correlation metric. The $R_{new\_CS}(d)$ denotes a value (i.e., energy of the OFDM symbol) for normalizing the $P_{new\_CS}(d)$ related to a great change in the size of the OFDM sample.

The $P_{new\_CS}(d)$ and the $R_{new\_CS}(d)$ are obtained according to the following [Formula 11] and [Formula 12], respectively.

$$P_{new\_CS}(d) = \sum_{m=1}^{N/2-1} r(d-m)r(d+m) \quad \text{[Formula 11]}$$

$$R_{new\_CS}(d) = \sum_{m=1}^{N/2-1} |r(d+m)|^2 \quad \text{[Formula 12]}$$

Here, $r_m$ denotes a reception signal.

Therefore, the receiving end obtains a maximum value d of the timing metric $M_{new\_CS}(d)$ for the reception signal, and the obtained maximum value d may be the starting point of the OFDM symbol.

The following formulas indicate examples of a timing metric of a changed shape which can be applied to the CP or CS which is employed to the method for detecting the symbol timing (synchronization) of the OFDM system according to the present invention.

$$M_{new}(d) = \frac{|P_{new}(d)|}{R_{new}(d)}$$

$$M_{new}(d) = \text{Re}\left\{\frac{P_{new}(d)}{R_{new}(d)}\right\}$$

$$M_{new}(d) = \text{Re}\left\{\frac{P_{new}(d)}{R_{new}(d)}\right\}\text{Re}\left\{\frac{P_{CP}(d-N/2-L)}{R_{CP}(d-N/2-L)}\right\} \text{ or } \text{Re}\left\{\frac{P_{new}(d)}{R_{new}(d)}\right\}$$

$$\text{Re}\left\{\frac{P_{CS}(d-N/2)}{R_{CS}(d-N/2)}\right\}$$

$$M_{new}(d) = \text{Re}\left\{\frac{P_{new}(d)}{R_{new}(d)}\right\} + \text{Re}\left\{\frac{P_{CP}(d-N/2-L)}{R_{CP}(d-N/2-L)}\right\} \text{ or } \text{Re}\left\{\frac{P_{new}(d)}{R_{new}(d)}\right\} +$$

$$\text{Re}\left\{\frac{P_{CS}(d-N/2-L)}{R_{CS}(d-N/2-L)}\right\}$$

$$M_{new}(d) = \frac{|P_{new}(d)|}{R_{new}(d)} + M_{CP}\left(d - \frac{N}{2} - L\right) \text{ or } \frac{|P_{new}(d)|}{R_{new}(d)} + M_{CS}\left(d - \frac{N}{2}\right)$$

Figure 6:
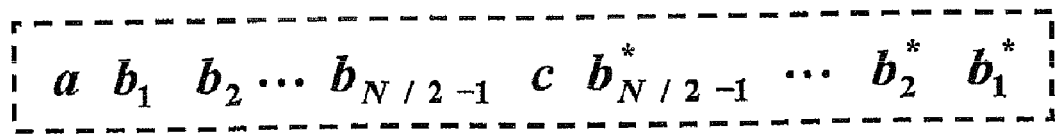
FIG. 6 is a view illustrating an OFDM symbol having a symmetrical structure.
Figure 7:
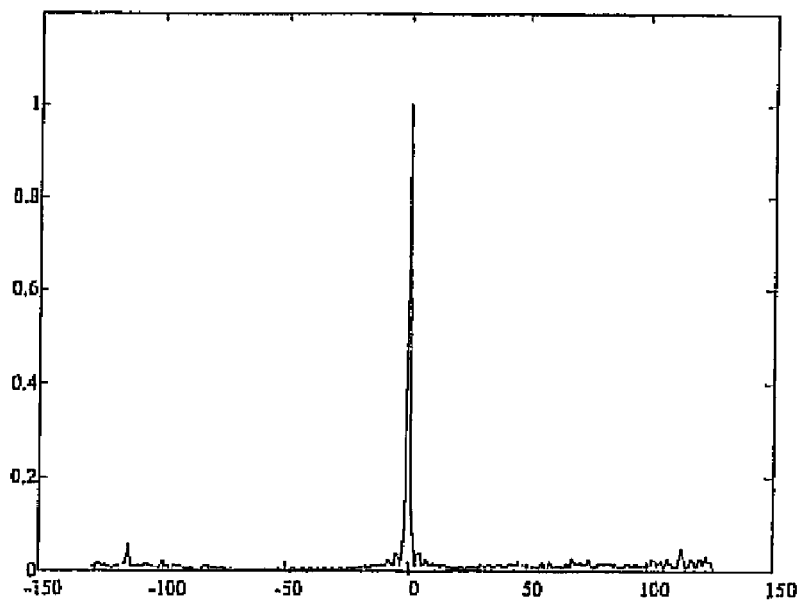
FIG. 7 is a graph for a timing metric $M_{new}(d)$ of an OFDM symbol using real valued data according to a first embodiment of the present invention.

In general, the data loaded on each subcarrier of the OFDM is composed of a real value and an imaginary value. If the data loaded on each subcarrier of the OFDM is composed of only a real value, the OFDM symbol has a symmetrical structure as shown in FIG. 6. In this case, when using timing metrics proposed in the present invention, as shown in FIG. 7, the timing metric of the OFDM symbol using the real-value data can have a precise maximum value.

Figure 8:
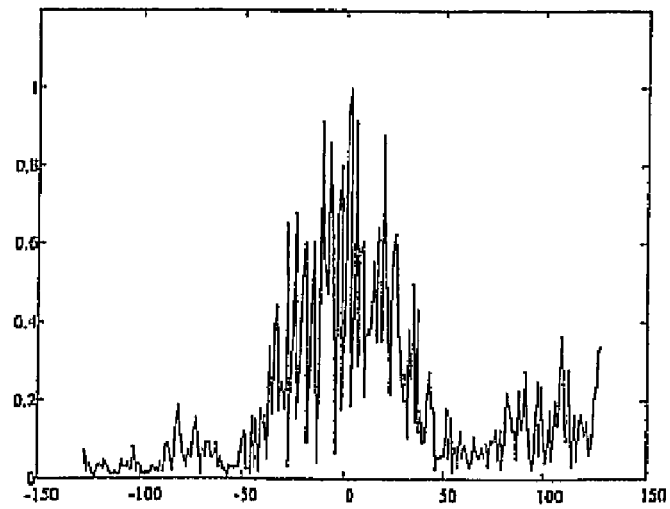
FIG. 8 is a graph for a timing metric $M_{new}(d)$ of an OFDM symbol using complex valued data according to the first embodiment of the present invention.
Figure 9:
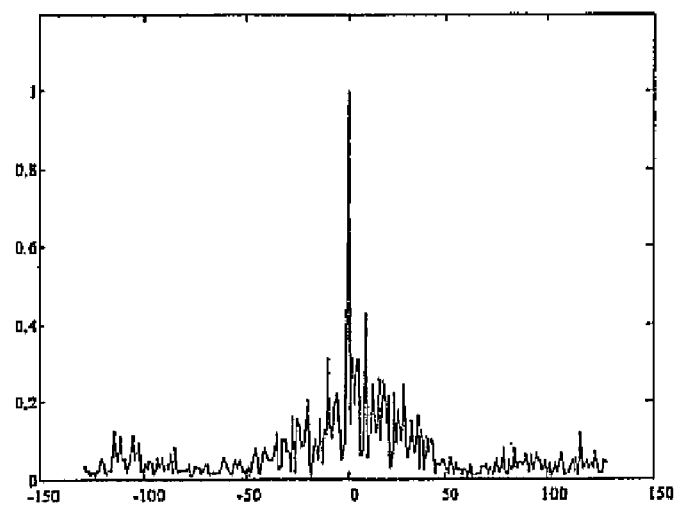
FIG. 9 is a graph for a timing metric $M_{new}(d)$ of an OFDM symbol using a part of data as a real valued pilot according to the present invention.

On the other hand, if each subcarrier of the OFDM includes data of a complex value (real value+imaginary value), the OFDM symbol, as different from when including only the real value as shown in FIG. 6, does not have the symmetrical structure. For this, as shown in FIG. 8, the timing metric of the OFDM symbol does not have the precise maximum value. However, if this case is applied to an actual system in which a part of such data is used as pilot having greater power than other data, the timing metric of the OFDM symbol can have the precise maximum value as shown in FIG. 9.

A second embodiment of the present invention proposes a structure of a new transmission symbol using both the CP and the CS and a timing metric capable of detecting a timing (synchronization) of the OFDM symbol more precisely.

Figure 10:
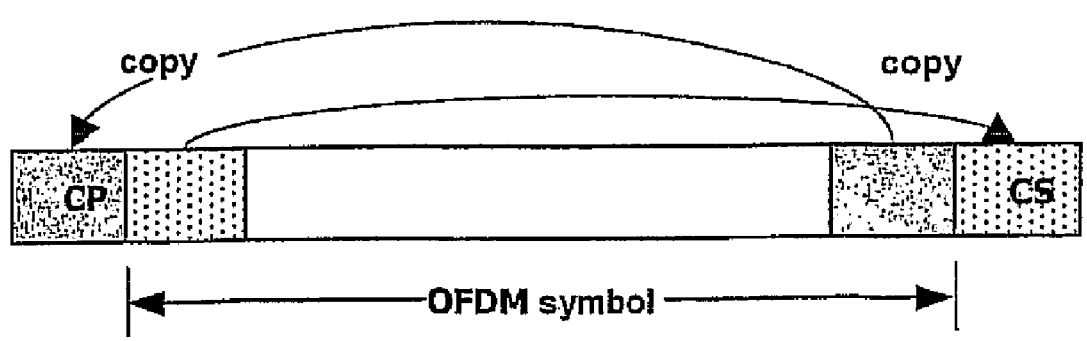
FIG. 10 is a view illustrating an exemplary structure of a transmission symbol according to the present invention.

FIG. 10 is a view illustrating an exemplary structure of a new transmission symbol proposed in the present invention.

As illustrated in FIG. 10, the new transmission symbol has a structure in which the CP and the CS are inserted in front and rear portions of the typical OFDM symbol, respectively.

For instance, since the data loaded on each subcarrier of the OFDM is composed of the real value and the imaginary value, if it is assumed that the real value of the OFDM symbol is a, and the imaginary value thereof is b, the transmission symbol according to the present invention and the typical OFDM symbol can be indicated as shown in FIG. 11. Comparing two drawings, it can be seen that the transmission symbol in accordance with the present invention has a shape that the CP and the CS are inserted in front and rear portions of the typical OFDM symbol, respectively. Accordingly, the transmitting end inserts front portion data (e.g., x, $a_1+b_1$) of the OFDM symbol in the CP, and Inserts rear portion data (e.g., $a_1*-b_1*$) In the CS to construct the transmission symbol.

Figure 3:
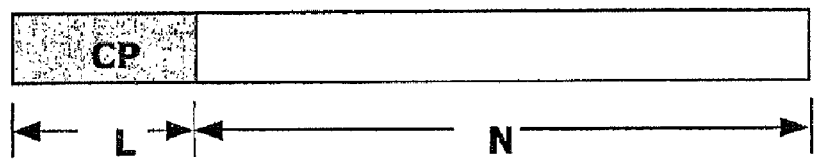
FIG. 3 is a view illustrating a length of a transmission symbol in which the CP or CS is inserted.
Figure 3:
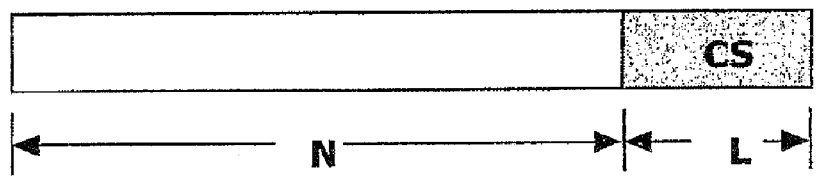
Figure 4:
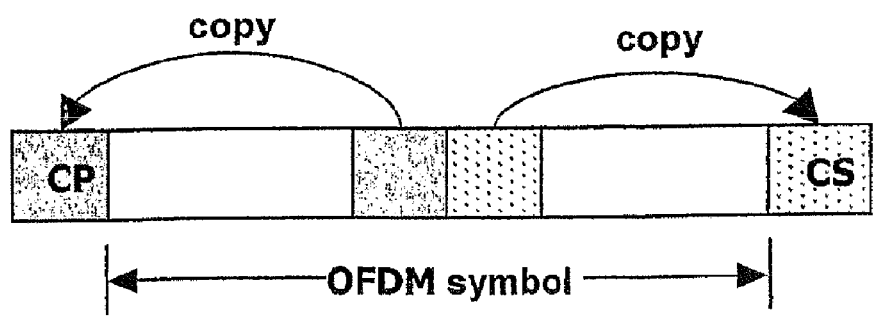
FIG. 4 is a view illustrating an exemplary structure of a transmission symbol in which both the CP and the CS are inserted.
Figure 5:
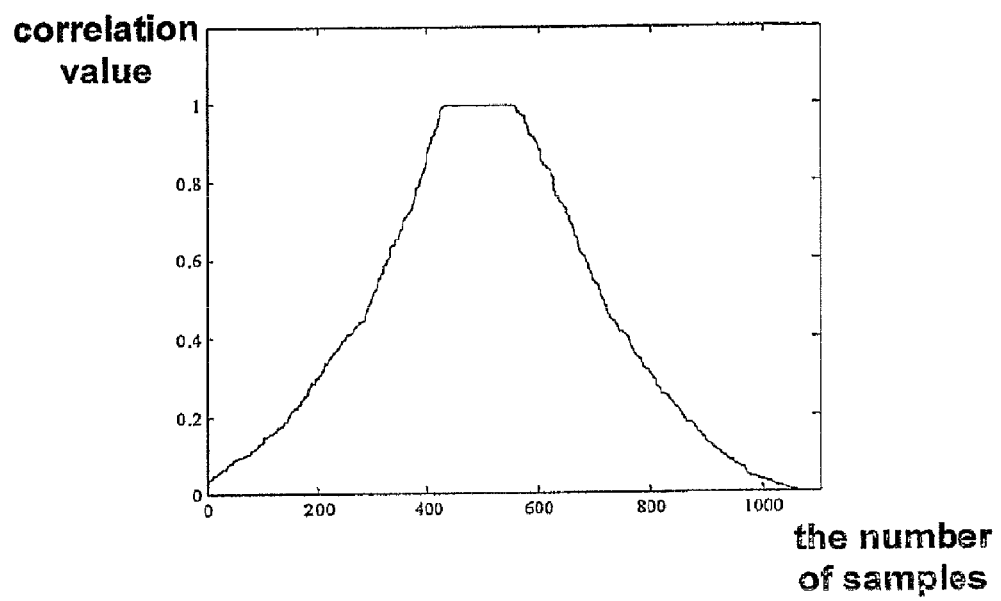
FIG. 5 is a graph illustrating a typical shape of correlation values using the CP or CS.

This structure allows maintaining of continuity of the transmission symbol which is different from the structure shown in FIG. 3. The structure in which the continuity of the symbol is not maintained cannot ensure orthogonality of each subcarrier to be thusly sensitive to a path delay.

The following [Formula 13] is a formula for a timing metric applied when using the transmission symbol structure proposed in the present invention.

$$M(d) = \frac{|P(d)|}{R(d)} \quad \text{[Formula 13]}$$

Here, M(d) may use a real value instead of an absolute value.

Also, the following [formula 14] and [Formula 15] are formulas for obtaining P(d) and R(d) of the [Formula 13].

$$P(d) = \frac{1}{2}\left[\sum_{m=1}^{L/2} r^*_{d+m}r_{d+m+N} + \sum_{m=1}^{L/2} r^*_{d-m}r_{d-m+N}\right] \quad \text{[Formula 14]}$$

$$R(d) = \sum_{m=1}^{L/2}\left|\frac{r_{d+m}+r^*_{d-m+N}}{2}\right|^2 + \sum_{m=1}^{L/2}\left|\frac{r_{d-m}-r^*_{d+m+N}}{2}\right|^2 \quad \text{[Formula 15]}$$

Here, L denotes a length of the CP, N denotes a length of the OFDM symbol, and $r_m$ denotes a reception signal, and $r_m^*$ denotes a complex conjugate of the reception signal.

Figure 12:
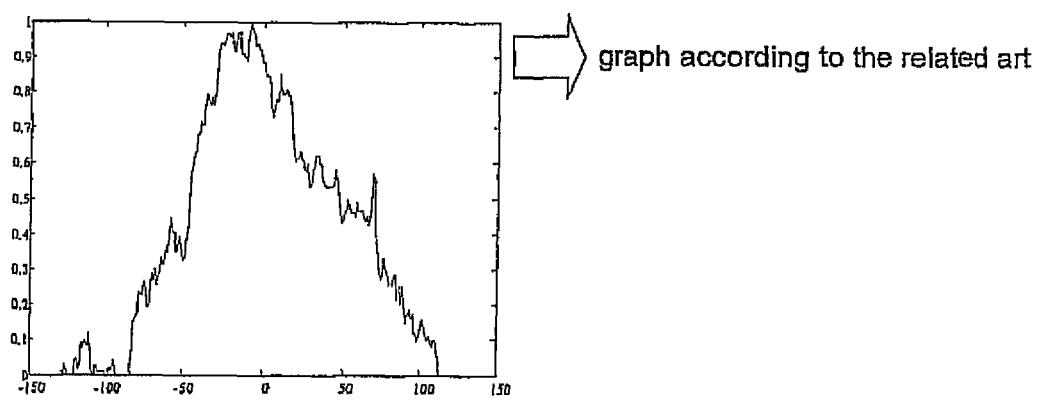
FIG. 12 is a graph in which a timing metric (SNR=0 dB) of a transmission symbol according to the second embodiment of the present invention is compared with a timing metric (SNR=0 dB) of the transmission symbol using the convention CP.
Figure 12:
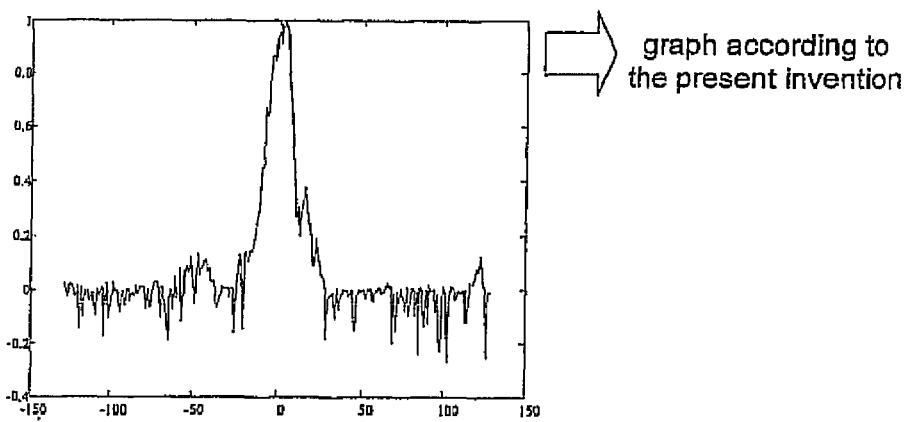

In the second embodiment of the present invention, the CP and the CS are inserted in the front and rear portions of the OFDM symbol, respectively, to thusly enable maintaining of the continuity of the transmission symbol, and accordingly the orthogonality of each subcarrier is ensured and the inter symbol interference (ISI) caused by the path delay can be reduced. Therefore, as can be seem upon comparison with FIG. 12, even in an environment that a Signal to Noise Ratio (SNR) is not good, the characteristic of the maximum value of the second embodiment according to the present invention is superior to that by the conventional method using the CP.

The present invention provides an Orthogonal Frequency Division Multiplexing (OFDM) system comprising: a receiver to receive a transmission symbol that has a Cyclic Prefix (CP) or a Cyclic Suffix (CS) inserted in a Orthogonal Frequency Division Multiplexing (OFDM) symbol; and a processor cooperating with the receiver to apply a particular timing metric to the received transmission symbol, to thusly detect a timing synchronization of the OFDM symbol based on a maximum value of the timing metric.

Also, the present invention provides an Orthogonal Frequency Division Multiplexing (OFDM) system comprising: a symbol generator to insert a Cyclic Prefix (CP) and a Cyclic Suffix (CS) in an Orthogonal Frequency Division Multiplexing (OFDM) symbol and generating a transmission symbol having continuity; a transmitter to transmit the generated transmission symbol; and a processor cooperating with the symbol generator and the transmitter to apply a particular timing metric to the transmission symbol, to thereby detect a timing synchronization of the OFDM symbol based on a maximum value of the timing metric.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore Intended to be embraced by the appended claims.

The invention claimed is:

1. A method for detecting a symbol timing synchronization of an Orthogonal Frequency Division Multiplexing (OFDM) system, the method comprising:

receiving, via the OFDM system configured to support transmissions of signals via radio channels that exhibit multi-path delays, a transmission symbol that has a Cyclic Prefix (CP) or a Cyclic Suffix (CS) inserted in a Orthogonal Frequency Division Multiplexing (OFDM) symbol; and applying either a first timing metric or a second timing metric to the received transmission symbol in order to detect a timing synchronization of the OFDM symbol based on a maximum value of the first or second timing metric, wherein the first timing metric is defined as shown in the following formula when the transmission symbol uses the CP:

$$M_{new\_CP}(d) = \frac{|P_{new\_CP}(d)|}{R_{new\_CP}(d)}M_{CP}\left(d - \frac{N}{2} - L\right),$$

wherein $P_{new\_CP(d)}$ denotes a correlation metric, $R_{new\_CP(d)}$ denotes an energy of the OFDM symbol, d denotes a time index, N denotes a length of the OFDM symbol, and L denotes a length of the CP, wherein the second timing metric is defined as shown in the following formula when the transmission symbol uses the CS:

$$M_{new\_CS}(d) = \frac{|P_{new\_CS}(d)|}{R_{new\_CS}(d)}M_{CS}\left(d - \frac{N}{2}\right),$$

wherein $P_{new\_CS(d)}$ denotes a correlation metric, $R_{new\_CS(d)}$ denotes an energy of the OFDM symbol, d denotes the time index, and N denotes the length of the OFDM symbol, wherein the correlation metric $P_{new\_CP(d)}$ is obtained by the following formula, wherein r denotes a reception signal, d denotes the time index, and N denotes the length of the OFDM symbol:

$$P_{new\_CP}(d) = \sum_{m=1}^{N/2-1} r(d-m)r(d+m).,$$

wherein the energy of the OFDM symbol $R_{new\_CP(d)}$ is obtained by the following formula, wherein r denotes the reception signal, d denotes the time index, and N denotes the length of the OFDM symbol:

$$R_{new\_CP}(d) = \sum_{m=1}^{N/2-1} |r(d+m)|^2.,$$

wherein the correlation metric $P_{new\_CS(d)}$ is obtained by the following formula, wherein r denotes the reception signal, d denotes the time index, and N denotes the length of the OFDM symbol:

$$P_{new\_CS}(d) = \sum_{m=1}^{N/2-1} r(d-m)r(d+m)., \text{ and}$$

wherein the energy of the OFDM symbol $R_{new\_CS(d)}$ is obtained by the following formula, wherein r denotes the reception signal, d denotes the time index, and N denotes the length of the OFDM symbol:

$$R_{new\_CS}(d) = \sum_{m=1}^{N/2-1} |r(d+m)|^2.$$

2. The method of claim 1, wherein the maximum value of the first timing metric denotes a position of the CP, and a value obtained by adding the length of the CP to the maximum value of the first timing metric denotes a starting point of the OFDM symbol.

3. The method of claim 1, wherein the maximum value of the second timing metric denotes a starting point of the OFDM symbol.

4. A method for detecting a symbol timing synchronization of an Orthogonal Frequency Division Multiplexing (OFDM) system, the method comprising:

inserting both a Cyclic Prefix (CP) and a Cyclic Suffix (CS) in an Orthogonal Frequency Division Multiplexing (OFDM) symbol and generating a transmission symbol having continuity;

transmitting the generated transmission symbol via the OFDM system configured to support transmissions of signals via radio channels that exhibit multi-path delays; and applying a particular timing metric to the transmission symbol in order to detect a timing synchronization of the OFDM symbol based on a maximum value of the timing metric, wherein the timing metric is defined by the following formula:

$$M(d) = \frac{|P(d)|}{R(d)},$$

wherein P(d) denotes a correlation metric, R(d) denotes an energy of the OFDM symbol, and d denotes a time index, wherein the correlation metric is obtained by the following formula:

$$P(d) = \frac{1}{2}\left[\sum_{m=1}^{L/2} r^*_{d+m} r_{d+m+N} + \sum_{m=1}^{L/2} r^*_{d-m} r_{d-m+N}\right],$$

wherein L denotes a length of the CP, N denotes a length of the OFDM symbol, $r_m$ denotes a reception signal, d denotes the time index, and $r_m^*$ denotes a complex conjugate of the reception signal, wherein the energy of the OFDM symbol is obtained by the following formula:

$$R(d) = \sum_{m=1}^{L/2} \left|\frac{r_{d+m} + r^*_{d-m+N}}{2}\right|^2 + \sum_{m=1}^{L/2} \left|\frac{r_{d-m} - r^*_{d+m+N}}{2}\right|^2., \text{ and}$$

wherein L denotes the length of the CP, N denotes the length of the OFDM symbol, $r_m$ denotes the reception signal, d denotes the time index, and $r_m^*$ denotes the complex conjugate of the reception signal.

5. The method of claim 4, wherein the transmission symbol is generated by simultaneously inserting the CP in a front portion of the OFDM symbol and inserting the CS in a rear portion of the OFDM symbol.

6. An Orthogonal Frequency Division Multiplexing (OFDM) system comprising:

a receiver to receive, via an OFDM system configured to support transmissions of signals via radio channels that exhibit multi-path delays, a transmission symbol that has a Cyclic Prefix (CP) or a Cyclic Suffix (CS) inserted in a Orthogonal Frequency Division Multiplexing (OFDM) symbol; and a processor cooperating with the receiver to apply either a first timing metric or a second timing metric to the received transmission symbol in order to detect a timing synchronization of the OFDM symbol based on a maximum value of the first or second timing metric, wherein the first timing metric is defined as shown in the following formula when the transmission symbol uses the CP:

$$M_{new\_CP}(d) = \frac{|P_{new\_CP}(d)|}{R_{new\_CP}(d)} M_{CP}\left(d - \frac{N}{2} - L\right),$$

wherein $P_{new\_CP(d)}$ denotes a correlation metric, $R_{new\_CP(d)}$ denotes an energy of the OFDM symbol, d denotes a time index, N denotes a length of the OFDM symbol, and L denotes a length of the CP, wherein the second timing metric is defined as shown in the following formula when the transmission symbol uses the CS:

$$M_{new\_CS}(d) = \frac{|P_{new\_CS}(d)|}{R_{new\_CS}(d)} M_{CS}\left(d - \frac{N}{2}\right),$$

wherein $P_{new\_CS(d)}$ denotes a correlation metric, $R_{new\_CS(d)}$ denotes an energy of the OFDM symbol, d denotes the time index, and N denotes the length of the OFDM symbol, wherein the correlation metric $P_{new\_CP(d)}$ is obtained by the following formula, wherein r denotes a reception signal, d denotes the time index, and N denotes the length of the OFDM symbol:

$$P_{new\_CP}(d) = \sum_{m=1}^{N/2-1} r(d-m)r(d+M).,$$

wherein the energy of the OFDM symbol $R_{new\_CP(d)}$ is obtained by the following formula, wherein r denotes the reception signal, d denotes the time index, and N denotes the length of the OFDM symbol:

$$R_{new\_CP}(d) = \sum_{m=1}^{N/2-1} |r(d+m)|^2.,$$

wherein the correlation metric $P_{new\_CS(d)}$ is obtained by the following formula, wherein r denotes the reception signal, d denotes the time index, and N denotes the length of the OFDM symbol:

$$P_{new\_CS}(d) = \sum_{m=1}^{N/2-1} r(d-m)r(d+M).,\quad \text{and}$$

wherein the energy of the OFDM symbol $R_{new\_CS(d)}$ is obtained by the following formula, wherein r denotes the reception signal, d denotes the time index, and N denotes the length of the OFDM symbol:

$$R_{new\_CS}(d) = \sum_{m=1}^{N/2-1} |r(d+m)|^2.$$

7. An Orthogonal Frequency Division Multiplexing (OFDM) system comprising:
- a symbol generator to insert at least a Cyclic Prefix (CP) or a Cyclic Suffix (CS) in an Orthogonal Frequency Division Multiplexing (OFDM) symbol and to generate a transmission symbol having continuity;
- a transmitter to transmit the generated transmission symbol via an OFDM system configured to support transmissions of signals via radio channels that exhibit multipath delays; and
- a processor cooperating with the symbol generator and the transmitter to apply a particular timing metric to the transmission symbol in order to detect a timing synchronization of the OFDM symbol based on a maximum value of the timing metric, wherein the timing metric is defined by the following formula:

$$M(d) = \frac{|P(d)|}{R(d)},$$

wherein P(d) denotes a correlation metric, R(d) denotes an energy of the symbol, and d denotes a time index, wherein the correlation metric is obtained by the following formula:

$$P(d) = \frac{1}{2}\left[\sum_{m=1}^{L/2} r^*_{d+m}r_{d+m+N} + \sum_{m=1}^{L/2} r^*_{d-m}r_{d-m+N}\right],$$

wherein L denotes a length of the CP, N denotes a length of the OFDM symbol, $r_m$ denotes a reception signal, d denotes the time index, and $r_m^*$ denotes a complex conjugate of the reception signal, wherein the energy of the OFDM symbol is obtained by the following formula:

$$R(d) = \sum_{m=1}^{L/2} \left|\frac{r_{d+m} + r^*_{d-m+N}}{2}\right|^2 + \sum_{m=1}^{L/2} \left|\frac{r_{d-m} + r^*_{d+m+N}}{2}\right|^2.,\quad \text{and}$$

wherein L denotes the length of the CP, N denotes the length of the OFDM symbol, $r_m$ denotes the reception signal, d denotes the time index, and $r_m^*$ denotes the complex conjugate of the reception signal.

* * * * *